Aug. 17, 1965   J. J. MUELLER ETAL   3,201,235
HOT PRESS FABRICATION OF THERMOELECTRIC ELEMENTS
Filed July 2, 1962

INVENTORS.
JOHN J. MUELLER
WINSTON SEETOO
BY
ATTORNEYS.

United States Patent Office 3,201,235
Patented Aug. 17, 1965

3,201,235
HOT PRESS FABRICATION OF THERMOELECTRIC ELEMENTS
John J. Mueller and Winston Seetoo, Baltimore, Md., assignors to Martin-Marietta Corporation, Baltimore, Md., a corporation of Maryland
Filed July 2, 1962, Ser. No. 206,715
9 Claims. (Cl. 75—201)

This invention relates to a method of fabricating thermoelectric elements and more particularly to a method involving the consolidation of pre-alloyed powders with the simultaneous application of pressure and heat.

At the present time, the methods employed in the fabrication of thermoelectric elements or arms composed of lead-telluride or other materials exhibiting desirable thermoelectric characteristics include; the melting and casting of the individual thermoelectric elements by use of a master alloy, the pressing and sintering of a powder alloy, a combination of the first and second methods in which the master alloy is formed by melting and casting with the master alloy being subsequently ground into a powder and the powder utilized in a pressing and sintering operation and lastly, an extrusion process in which a fluid master alloy material is extruded into a solid element.

All of these methods have the disadvantage that the subsequent joining of the individual elements to electrodes, cold junction leads, or to a hot junction shoe must be performed in a separate operation, and at the present time, none of the known methods for accomplishing this step provide acceptable results. The conventional methods of subsequently joining the elements to the electrodes or to the hot junction shoes involve welding by incipient melting the end of the element while in contact with an electrode or a shoe, the diffusion bonding of the element to an intermediate metal plated electrode or shoe which is conventionally formed of iron or one of its alloys, or third, by a method involving the brazing of the elements to a ferrous alloy shoe or electrode by means of a lower melting spacer, conventionally formed of Ge-Te.

With regard to the thermoelectric element or arm itself, the cast product made from the alloying materials prepared in master alloy form has extremely coarse grains and exhibits undesirable fragility, which leads to failure by the formation of gross cleavage type fracture surfaces. The cold pressed and sintered-type element, while exhibiting good mechanical properties and high density, has relatively high electrical resistivity attributable to poor powder particle coalescence.

It is, therefore, a primary object of the present invention to provide an improved method of fabricating a thermoelectric element which is fine-grained, of high density, and has good mechanical and electrical properties.

It is a further object of this invention to provide an improved method of fabricating a thermoelectric element from which the resultant product has increased ruggedness with an ability to absorb higher thermal and mechanical shock loads than elements formed by the prior art techniques.

It is a further object of this invention to provide an improved method of fabricating a thermoelectric element in which the elements can be made with increased physical dimensions, without the constituent segregation defects and electrical property difficulties associated with the elements formed by the prior art methods.

In the utilization of the individual thermoelectric elements formed of N-type or P-type material, the basic thermoelectric device, which is commonly called a couple, includes spaced thermoelectric elements or arms of dissimilar material coupled to a common electrical and thermal base conductor. The operation of the thermoelectric device depends upon a temperature differential existing between the ends of the thermoelectric elements. The ends of the spaced, dissimilar elements are conventionally, mechanically, and electrically coupled to a common heat collector with independent cold junction electrical leads connected to the free end of the spaced, thermoelectric elements. The common heat collector is generally formed of iron or an iron alloy while the cold junction lead may be formed of a material exhibiting excellent electrical conductive properties, such as copper.

In the past, the fabrication of a complete thermoelectric couple included a sequence of steps involving; the formation of the individual thermoelectric elements by either a casting or a pressing and sintering operation, the bonding of the individual elements to electrical contacts at either end thereof, the bonding of the contact carrying elements to a common heat collector, and the brazing of electrical leads to the free contact carrying ends of the spaced thermoelectric element.

It is a further object of this invention to provide an improved method of fabricating a thermoelectric element involving the consolidation of pre-alloyed powders with the simultaneous application of pressure and heat in which the electrodes are bonded to the ends of the thermoelectric elements during the fabrication by hot pressing.

It is a further object of this invention to provide an improved method of fabricating a thermoelectric couple in which a pair of spaced thermoelectric elements may be fabricated by hot pressing while simultaneously coupling the elements respectively to a common heat collector and to independent cold junction electrodes.

It is a further object of this invention to provide an improved thermoelectric couple by this method in which the junction resistance between the elements is lower than that normally obtained by prior art manufacturing processes.

Further objects of this invention will be pointed out in the following detailed description and claims and illustrated in the accompanying drawing which discloses, by way of example, the principle of this invention and the best mode which has been contemplated of applying that principle.

In general, the method of the present invention is utilized in the fabrication of thermoelectric elements in the broadest sense and employs a step of consolidating pre-alloy powders by the simultaneous application of pressure and heat. The improved method of this invention may be advantageously applied to the simultaneous bonding of a thermoelectric element to its electrodes or a pair of dissimilar elements to their respective electrodes and the common heat collector or shoe.

Figure 1:
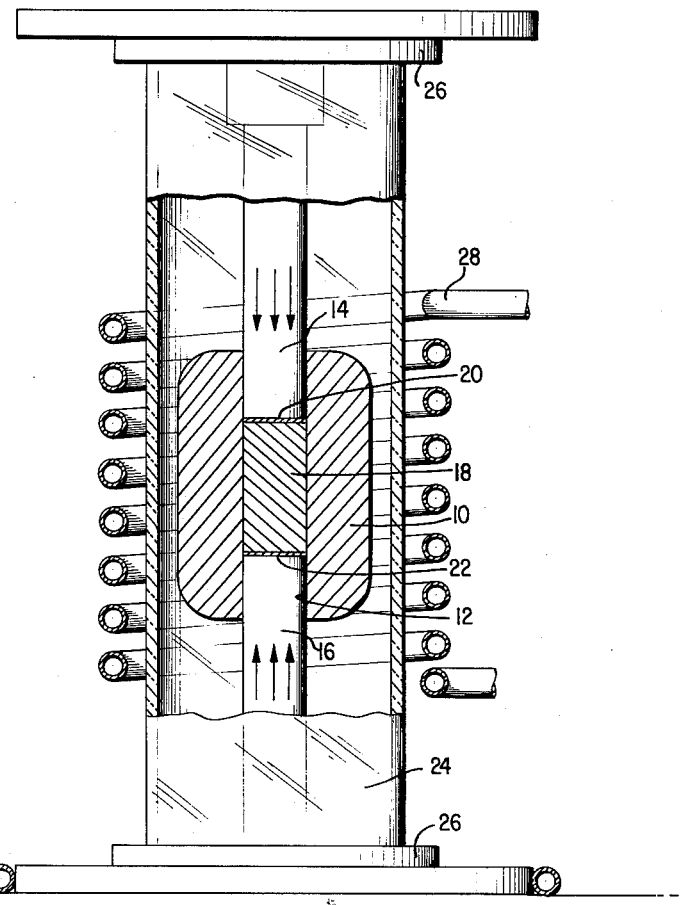
FIG. 1 is a side elevational view, partially in section, of the apparatus used in performing the method of the present invention.

Referring to the drawing, there is shown in FIG. 1 one form of an apparatus made use of in practicing the method of the present invention. In general, the apparatus provides for the simultaneous application of heat and pressure to a confined mass of pre-alloyed, powdered, thermoelectric material, such as lead telluride. The structure shown in the drawing represents schematically the elements necessary for the formation of a finished product. It is not the intention, therefore, to be limited to the exact apparatus shown and various substitutions may be made in the apparatus without departing from the method of the present invention. A centrally located die 10 includes a throughbore 12 which acts to receive a pair of oppositely moving die pins or punches including an upper pin 14 and a lower pin 16, respectively. The pins 14 and 16 have a diameter equal to the diameter of the bore 12 and are therefore matably received within die 10. Suitable means (not shown) are provided for reciprocating both die pins 14 and 16 toward the center of the die 10 to compress any material therebetween. A mass of thermoelectric material, such as granular lead telluride 18, is positioned within bore 12 between the opposed die pins 14 and 16. In the operation of the apparatus shown under the method of the present invention, a cold junction electrode 20 and a hot junction electrode 22, formed of iron or a ferrous alloy, may be simultaneously bonded electrically and mechanically to the thermoelectric element formed by the granular mass 18. Since it is desirable to effect the fabrication of the thermoelectric element in an inert atmosphere to prevent oxidation of the surfaces of the electrodes, and thus insure an intimate bond between the electrodes and the resulting thermoelectric element, a cylindrical "Vycor" glass tube 24 surrounds this portion of the apparatus and includes at either end appropriate sealing means (not shown). A hydraulic or pneumatic motor (not shown) is provided for effecting reciprocation of die pins 14 and 16. In order to simultaneously heat the thermoelectric material 18 during the fabrication process, an electric induction coil 28 is coaxially mounted on the "Vycor" tube 24 and surrounds the tube but is spaced therefrom. Suitable means (not shown) are provided for energizing the electrical coil 28 simultaneously with the application of pressure on the outer ends of the die pins 14 and 16 to effect a hot press formation of the thermoelectric element and an integral bond between the electrodes 20 and 22 on either end of the thermoelectric element. The die 10 may be formed of graphite since it is compatible with lead telluride, the graphite being of a grade providing high density. The die pins may be likewise formed of graphite, although it has been found that molybdenum pins provide the desired ruggedness. In applications where the lead telluride element is formed without electrodes or a shoe, a graphite disk may be placed on each end of the body of powder between the molybdenum surfaces and the lead telluride powder. Various sized Pb–Te powders may be used; however, the normal casting stock, which is about a −14 mesh, including fines, has been found to be quite satisfactory. In the manufacture of thermoelectric elements or arms, which are in the order of three-eighths of an inch in diameter and three-fourths of an inch long, it has been determined that for adequately obtaining sound bodies with a general 2 to 1 length to diameter ratio, the following processing conditions are desirable:

Temperature—1450 to 1600° F.
Die pressure—1000 p.s.i. to 1700 p.s.i.
Time—5 minutes to 10 minutes at temperature and pressure.

As an example, an element having high, uniform density and satisfactory electrical, mechanical, and thermal characteristics was fabricated having a three-eighth inch diameter and a three-quarter inch length by fabrication at a temperature of 1450° F. with an applied pressure of 1700° p.s.i. for a fabrication time of 10 minutes at temperature and pressure. Specimens were fabricated under these conditions from both crushed bulk melt stock, crushed as "cast" elements and crushed annealed elements. The P-type elements hot pressed from bulk melt stock were approximately equal in Seebeck voltage to the cast products but were slightly higher in resistivity. Those hot pressed from the crushed element stock, however, were slightly higher in both Seebeck voltage and resistivity than the cast products. Since the two hot pressed products were reasonably equivalent and both composed quite favorably with products produced by conventional methods, the bulk melt casting stock was selected as a more desirable starting material since the intermediate casting step is eliminated.

The hot pressed elements prepared from the bulk melt stock and from the crushed, annealed element stock had only slightly different electrical properties, indicating reasonable equivalence. The Seebeck voltages resulting from these materials were lower than that of the cast element bue were reasonable in the light of the accompanying lower resistivities.

The improved method of the present invention has particular applicability to the fabrication and simultaneous bonding of the thermoelectric material to either the hot shoe or an electrode at the cold junction. In the past, iron has been used in general as the material forming the hot shoe. However, its compatibility, expansion wise, has been questioned because of the variation in expansion rate between the iron and the lead telluride. The expansion rate of iron is approximately 10.7 while that of lead telluride is about 18, a reasonably uncomfortable fit. Since the thermoelectric element may be bonded directly to the shoe with no cushioning type braze, this becomes a prime consideration in the method of the present invention. In addition to iron, several other shoe or electrode materials are available, these materials being more compatible to the thermoelectric material, lead telluride. These materials are the 300 series stainless steel and three iron-aluminum base alloys. Specifically, materials which may be used are type 316 stainless steel, Fe-7% aluminum alloy, Fe-7% aluminum-5% chromium alloy and Martin DB-2 alloy. In the form shown in FIG. 1 the electrodes are made as circular disks 20 and 22. After fabrication, the specimens were placed in a capsule and were thermally cycled 6 times between room temperature and 650° C. The combinations, with the exception of iron used with a P-type lead telluride, performed satisfactory from the standpoint of thermal expansion compatibility. Due to the extreme brittleness of the P-type material, a complete separation between the P-type lead telluride and the iron shoe occurred. In addition to temperature compatibility, it is important that the material acting as the shoes does not tend to dope the thermoelectric material with which the elements are coupled. The five shoe materials included pure Fe, 300 series stainless steel, (S.S.), Fe-7% Al alloy (FeAl), Fe-7%, Al-5%, Cr alloy (FeAlCr) and Martin DB-2 alloy (Fe-7%, Al-5%, C-½%, Ti-1%, Cb) The changes in the N-type element were random and insignificant, indicating no doping effects. The P-type elements however, showed additional increases in Seebeck voltage and resistivity. However, the increases were of such a value as not to preclude the use of the elements. The measurement of the electrical junction resistances occurring between the 2 shoe materials and the P-type and N-type lead telluride element indicated that the resistance values were generally lower than the junction resistances occurring where the thermoelectric elements were fabricated completely, prior to brazing to the electrodes or shoes.

The manufacture of the individual thermoelectric elements and the simultaneous bonding of the elements to associated electrodes at either end of the thermoelectric element requires the subsequent operational step of brazing one electrode to a common heat collector at the hot junction of the thermoelectric couple and brazing or soldering of the opposite electrode of the element to an electrical lead. Under the method of the present invention, the fabrication of a complete thermoelectric couple comprises only three steps, 1 (the element fabrication), 2 (brazing to the heat collector) and 3 (soldering of the cold lead). As an example, the following steps were performed. In preparation for the hot pressing, the electrical leads formed of stainless steel were pretinned with a thin film of lead-tin solder on the surface to be bonded to the thermoelectric element. The sharp edges of the leads were removed to permit free movement in the die cavity or bore 12 without the possibility of scraping graphite loose from the die wall. Obviously, any scraping action leads to graphite filled defects at the electrical lead to the elemental junction. The die was loaded by first fitting a die pin 16 with electrical lead 22 on its end into the die. The pin was then located and held in its initial position for pressing within die 10. A precalculated and weighed amount of lead telluride powder 18 was then poured into the die cavity 12 atop the electrical lead 22. A second electrical lead 20 was gently dropped atop the powder and the remaining die pin 14 inserted. With the pins 14–16 held firmly in position, the die assembly was inserted between the pressing means (not shown) and pressed gently to lock assembly in place. The relative positions of all the components were arranged before hand so that the die was located properly with respect to induction coil 28. The pressing sequence followed:

(1) The cold powder was pressurized to about 1200 p.s.i. to produce some initial consolidation and then pressure was reduced to about 500 p.s.i.

(2) The apparatus was heated.

(3) When temperature was reached, pressure was increased to a stable value of 1700 p.s.i.

(4) The temperature was raised to 1450° F. while maintaining 1700 p.s.i. pressure.

(5) Temperature was held for 5 to 6 minutes, then the coil de-energized.

(6) The apparatus was allowed to cool normally to 500° F. while maintaining pressure of 1700 p.s.i.

(7) The article was removed from the press when the temperature reached 500° F.

Figure 2:
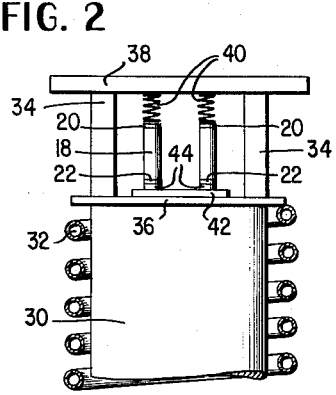
FIG. 2 is a side elevational view of the apparatus employed in bonding the elements fabricated by the apparatus of FIG. 1 to a common hot shoe.

The second principal step is accomplished by brazing the individual thermoelectric elements carrying the bonded electrodes to the common heat collector forming the hot junction on the apparatus, and the electrical leads soldered to the cold electrode. The particular apparatus which may be used for accomplishing this portion of the fabricating process is shown in FIG. 2 of the drawing. The apparatus makes use of a solid graphite block 30 around which is positioned an induction coil 32 which acts to heat the block and the apparatus supported thereon. A spring-loaded mounting fixture includes a pair of spaced uprights 34 mounted on the upper surface of the base plate 36 with a transverse member 38 extending between the uprights 34 at the upper end thereof. A pair of spring members 40 are rigidly coupled to the bottom surface of transverse member 38 and exert ownward pressure on the spaced thermoelectric elements 18 which are to be brazed to a common heat conductor 42 which may be formed of iron. The thermoelectric elements 18 have bonded electrodes 20 and 22 at either end. In order to braze the common heat conductor 42 to the electrodes 22, a suitable brazing flux and a small disk 44 of silver braze alloy, is provided between the mating surfaces. Prior to positioning the elements in the manner shown in FIG. 3, the outer surfaces of the electrodes 22 and the upper surface of the heat collector 42 are mechanically abraded. The outer edges of the electrical leads are preferably coated with braze stop off to prevent braze alloy migration. The surfaces of each electrode in the portion of the heat collector to be brazed are coated with a minimum amount of silver brazing flux. Brazing is accomplished by induction heating of the graphite block 30 through energization of the induction coil 32 with the brazing fixture heated slowly by conduction of heat from the supporting block 30 to the elements supported thereby.

Conventional means such as a soldering gun and fluxed-tin solder may be used for soldering the cold leads to the upper electrodes 20 associated with the spaced elements 18. If desired, the soldering of the cold leads may be accomplished simultaneously with the brazing of the heat collector by the apparatus of FIG. 2. The temperature reached at the cold ends of the couple is sufficient to produce a solder bond between the prebonded stainless steel electrode 20 and the electrical leads to be attached thereto.

Figure 3:
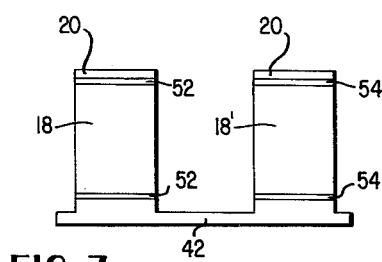
FIG. 3 is a side elevational view of a thermoelectric couple fabricated by one method of the present invention.

In addition to the three step process outlined above, the method of the present invention may be advantageously applied to the formation of a complete thermoelectric couple (with the exception of the soldered cold end leads) involving the simultaneous pressing of P and N-type thermoelectric elements to a common heat collector and independent cold junction electrodes in the assembly of the particular thermoelectric couple shown in FIG. 3. The thermoelectric element 18 is assumed to be formed of a P-type material while the thermoelectric element 18', to the right, is assumed to be formed of an N-type material. A common heat collector 42, which may be contoured to suit the die configuration, is positioned at one end of the thermoelectric materials and individual cold end electrodes 20 at the opposite end. The cold end electrodes 20 and heat collector electrode 42 to be joined to the element material are coated on their surfaces with an alloy tending to inhibit oxidation while achieving a mechanical and electrical bond between the elements and the electrodes. For instance, with respect to the P-type thermoelectric element 18, the coating 52 is formed of a tin alloy while the coating 54 on the stainless steel electrodes 20 and 42 associated with N-type thermoelectric element 18' are coated with a lead alloy, the lead alloy being more compatible with the N-type thermoelectric element without affecting the electrical properties of the element. The electrodes are fitted in the pressing die with the masses of powdered thermoelectric material positioned between the electrodes. The components are subjected to high pressure in the neighborhood of 1700 p.s.i. and a temperature in the order of 1450° F. for a period of time of between 5 and 10 minutes to effect the completion of a thermoelectric couple indicated by the finished product of FIG. 3.

While there have been shown and described and pointed out the fundamental novel features as applied to preferred embodiments, it will be understood that various omissions and substitutions and changes in the form and detail of the device illustrated, and in its application to the method of the present invention may be made by those skilled in the art without departing from the spirit of the invention. It is the intention, therefore, to be limited only as indicated by the scope of the following claims.

What is claimed is:

1. A method of simultaneously fabricating a thermoelectric element characterized by small grain size and high density and bonding the same to a metal electrode comprising the steps of: confining a mass of powdered lead telluride material in contact with an electrode formed of a material selected from the group consisting of; pure iron, 300 series stainless steel, an aluminum alloy steel, an aluminum chromium alloy steel, and an aluminum chromium, titanium and columbium alloy steel, and simultaneously subjecting said confined mass and said metal electrode to a pressure of 1000 p.s.i. to 1700 p.s.i. at a temperature of 1450° to 1600° F., for a time period of from 5 to 10 minutes to coalesce the powder and to fuze the same to said metal electrode.

2. A method of simultaneously fabricating a thermoelectric element formed of lead telluride characterized by small grain size and high density and having a length in the order of twice the width and bonding the same to a metal electrode formed of a material selected from the group consisting of; pure iron, a 300 series stainless steel, an aluminum alloy steel, an aluminum chromium alloy steel, and an aluminum chromium titanium columbium alloy steel, comprising the steps of: confining a mass of powdered lead telluride material in contact with said metal electrode and simultaneously subjecting said confined mass and said electrode to a temperature of 1450° F. at a pressure of 1700 p.s.i. for a period of time of 10 minutes whereby said powder is coalesced and fuzed to said metal electrode.

3. A method of simultaneously fabricating a thermoelectric element characterized by small grain size and high density and bonding the same to a metal contact member comprising the steps of: confining a mass of powdered thermoelectric material in contact with said electrode, pressurizing said mass of thermoelectric material in contact with said electrode to a pressure in the order of 1200 p.s.i. to produce initial consolidation, reducing the pressure to 500 p.s.i., heating said elements to 1200° F., pressurizing said elements after reaching 1200° F. to a stable value of 1700 p.s.i., holding said elements at a temperature of 1450° F. and 1700 p.s.i. pressure for a period of time from 5 to 10 minutes, removing the heat source and allowing the element to cool to 500° F. while maintaining the pressure of 1700 p.s.i. and subsequently removing the pressure when this temperature has been reached whereby said thermoelectric is coalesced and fuzed to said metal electrode.

4. A method of brazing electrical leads to one end of a pair of dissimilar thermoelectric elements formed by hot pressing a mass of powdered thermoelectric material in contact with spaced metal electrodes and a common hot shoe to the other ends of said pair of dissimilar thermoelectric elements comprising the steps of placing said hot shoe on a graphite support member, positioning said pair of dissimilar thermoelectric elements in spaced relation on the upper surface of said hot shoe, providing a thin layer of brazing material between said shoe and respective thermoelectric elements, positioning respective electrical leads on the outer ends of said dissimilar thermoelectric elements providing solder between said electrical leads and said electrodes on the outer ends of said thermoelectric material, biasing said assembled elements together and simultaneously brazing said elements in assembled relation by heating said graphite support member.

5. A method of fabricating a complete thermoelectric couple characterized by the thermoelectric elements having small grain size and high density comprising the steps of: providing separate, confined masses of powdered thermoelectric material having dissimilar characteristics for forming spaced P-type and N-type thermoelectric elements, positioning a common hot shoe on one side of said spaced, confined masses, and positioning individual spaced metal electrodes on the opposite sides of the respective masses of powdered thermoelectric material, and simultaneously subjecting said confined masses, said hot shoe, and said spaced electrodes to a relatively high temperature and pressure to coalesce the powder and fuze the same to respective electrodes and said common hot shoe.

6. A method of fabricating a complete thermoelectric couple characterized by the thermoelectric elements having small grain size and high density comprising the steps of providing separate, confined masses of powdered thermoelectric material having dissimilar characteristics to form spaced P-type and N-type thermoelectric elements, positioning a common, metal hot shoe on one side of said spaced, confined masses, positioning individual spaced cold junction electrodes on the opposite sides of said separate masses of thermoelectric material and simultaneously subjecting said confined masses of material, said electrodes and said common hot shoe, to a temperature in the range of 1450 to 1600° F., at a pressure of 1000 p.s.i. to 1700 p.s.i. for a time period of from 5 to 10 minutes whereby said respective masses of materials are coalesced and fuzed to said individual electrodes and said common hot shoe.

7. A method of fabricating a complete thermoelectric couple characterized by the thermoelectric element having a small grain size and a high density with a length in the order of twice the width, comprising the steps of: providing separate, confined masses of powdered thermoelectric material having dissimilar characteristics to form spaced P-type and N-type thermoelectric elements, positioning a common metal hot shoe on one side of said spaced, confined masses and positioning individual, spaced, metal cold junction electrodes on opposite sides of the respective masses and simultaneously heating said elements to a temperature of 1400° F. at a pressure of 1700 p.s.i. for a period of time in the order of 10 minutes to effect the coalescence of said powdered thermoelectric material and the bonding of the same to said spaced electrodes and said common hot shoe.

8. A method of fabricating a complete thermoelectric couple characterized by the thermoelectric elements having a length to width ratio of 2 to 1, a small grain size and high density comprising the steps of: providing separate, confined masses of powdered lead-telluride material having dissimilar characteristics to form spaced P-type and N-type thermoelectric elements, positioning a common hot shoe on one side of said spaced, confined masses of thermoelectric material and individually spaced electrodes on the opposite side of said respective masses formed of a material selected from the group consisting of: pure iron, 300 series stainless steel, aluminum alloy steel, aluminum chromium alloy steel, aluminum chromium titanium, columbium alloy steel and simultaneously subjecting said assembly to a temperature in the range of 1450 to 1600° F. at a pressure of 1000 p.s.i. to 1700 p.s.i. for a time period of from 5 to 10 minutes to coalesce the powder and fuze the same to said elements coupled thereto.

9. A method of fabricating a complete thermoelectric couple characterized by the thermoelectric elements having a length to width ratio of 2 to 1 with small grain size and high density comprising the steps of providing separate, confined masses of powdered lead-telluride having dissimilar characteristics to form spaced, P-type and N-type thermoelectric elements, positioning a pair of metal electrodes on either side of said respective confined masses of powdered lead-telluride material formed of a material selected from the group consisting of pure iron, 300 series stainless steel, aluminum alloy steel, aluminum chromium alloy steel, aluminum chromium titanium, columbium alloy steel, positioning a stainless steel hot shoe in overlying relationship to respective electrodes on one side of said confined masses of thermoelectric material and subjecting said assembly to a temperature within the range of 1450° to 1600° F. at a pressure within the range of 1000 p.s.i. to 1700 p.s.i. for a time period within the range of from 5 minutes to 10 minutes to coalesce said masses of powdered lead-telluride and to bond the elements of said assembly into a unitary thermoelectric couple.

References Cited by the Examiner

UNITED STATES PATENTS

| | | | |
|---|---|---|---|
| 1,896,853 | 2/33 | Taylor | 75—22 |
| 2,355,954 | 8/44 | Cremen | 75—22 |
| 2,393,130 | 1/46 | Toulmin | 219—9.5 |
| 3,132,488 | 5/64 | Epstein | 75—226 |

CARL D. QUARFORTH, *Primary Examiner.*

RICHARD M. WOOD, *Examiner.*